United States Patent Office 3,219,522
Patented Nov. 23, 1965

3,219,522
PROCESS FOR CONTROLLING FUNGI WITH IMIDAZOLES, IMIDAZOLINES, PYRIMIDINES, AND DIAZACYCLOOCTENES AND DIAZEPINES
Philip N. Gordon, Old Lyme, Conn., assignor to Chas. Pfizer & Co. Inc., New York, N.Y., a corporation of Delaware
No Drawing. Original application Dec. 22, 1958, Ser. No. 779,608. Divided and this application Aug. 23, 1962, Ser. No. 218,832
11 Claims. (Cl. 167—33)

This application is concerned with new and useful anti-pathogenic agents. More particularly it is concerned with certain alkylmercapto, alkenylmercapto, alkoxy and alkenoxy substituted nitrogen containing heterocycles as well as the acid addition and quaternary alkyl ammonium salts of these compounds.

This application is a divisional application of my copending application Serial No. 779,608, filed December 22, 1958, which in turn is a continuation-in-part application of my earlier application Serial No. 705,133, filed December 26, 1957. Both applications are now abandoned.

It has now been discovered that certain 2-alkylmercapto-, 2-alkenyl-mercapto-, 2-alkoxy- and 2-alkenoxy-imidazoles, imidazolines, pyrimidines, 1,4,5,6-tetrahydropyrimidines, 4,5,6,7-tetrahydro - 1,3 - diazepines and 1,3-diazacyclooctenes-2, various substituted derivatives of these, as explained more fully hereinafter, quaternary alkyl ammonium derivatives of these, as well as their acid addition salts are useful anti-pathogenic agents in the control of plant and animal pathogens including those which infect human hosts. They have also proved to be useful anthelmintic agents.

The acid addition salts which, together with the corresponding free bases and quaternary alkyl ammonium salts constitute the compounds within the scope of this invention are represented by the formula

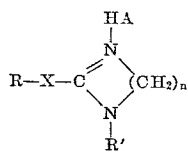

wherein R is selected from the group consisting of alkyl and alkenyl groups containing from one to eighteen carbon atoms; X is selected from the group consisting of oxygen and sulfur, $n$ is an integer from two to five, R' is selected from the group consisting of hydrogen, alkyl and alkenyl containing from one to six carbon atoms; the total number of carbon atoms in said R and R' groups being from six to twenty-four. Also included within the purview of the invention are further compounds of the class defined above wherein $n$ is 2 or 3 and adjacent carbon atoms in the heterocyclic ring form a conjugated system. The free base compounds in which $n$ is 2 or 3 correspond to the following formulas, respectively:

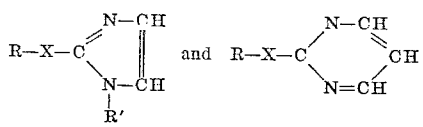

In a quaternary alkyl ammonium salt of this invention, an alkyl group contains from 1 to 4 carbon atoms.

In the above formula, A is an anion of an acid which may be either organic or inorganic. The identity of A will depend upon the particular application of the compounds. Thus an acid addition salt which is acceptable in agricultural practice may be too toxic for use in human therapy and one which may have solubility characteristics suitable for the treatment of plant pathogens may be too soluble or insoluble for other uses. These same anions may also form the negatively charged portion of a quarternary alkyl ammonium salt of this invention.

Other acid addition salts may not be useful for either plant or animal treatment for any of a number of reasons known to those skilled in the art, but they are nonetheless useful for preparative and storage purposes. Thus, for instance, a hydrofluoride acid addition salt would not ordinarily be used for human therapy or in the control of plant pathogens, but it is useful as an intermediate in the preparation of compounds which may be so employed.

Compounds within the purview of this invention include those selected from the following classes:

Alkylmercaptoimidazoles
Alkenylmercaptoimidazoles
Alkylmercaptoimidazolines
Alkenylmercaptoimidazolines
Alkylmercaptopyrimidines
Alkenylmercaptopyrimidines
Alkylmercapto-1,4,5,6-tetrahydropyrimidines
Alkenylmercapto-1,4,5,6-tetrahydropyrimidines
Alkylmercapto-4,5,6,7-tetrahydro-1,3-diazepines
Alkenylmercapto-4,5,6,7-tetrahydro-1,3-diazepines
Alkylmercapto-1,3-diazacyclooctenes-2
Alkenylmercapto-1,3-diazacyclooctenes-2

The corresponding alkoxy compounds are also included.
Certain derivatives of these compounds are also useful anti-pathogenic agents. For example, the acid addition salts and quaternary alkyl ammonium salts wherein the alkyl group contains from 1 to 4 carbon atoms may be successfully employed in the treatment of various pathogenic conditions. Compounds of this invention can be prepared as N-alkyl substituted derivatives which can also be converted to acid addition salts or quaternary alkyl ammonium salts. These too are useful antipathogens.

It is an essential feature of this invention that the total number of carbon atoms in alkyl and alkenyl groups attached to oxygen, sulfur or nitrogen atoms, excluding the alkyl group of a quaternary salt, be at least six. Thus, if there is no N-alkyl or alkenyl substituent, the alkyl or alkenyl group attached to an oxygen or sulfur atom will contain at least six carbon atoms. On the other hand, if there is an N-alkyl or alkenyl group, the total number of carbon atoms in this group and the alkyl or alkenyl group attached to an oxygen or sulfur atom should equal at least seven. In any case, the total number of carbon atoms in these alkyl or alkenyl groups will not exceed twenty-four carbon atoms.

The alkyl and alkenylmercaptoimidazoles of this reaction are prepared by reaction between the sodium salt of a 2-mercaptoimidazole and an alkyl or alkenyl halide. The necessary 2-mercaptoimidazole is readily prepared by reaction between the diacetal of aminoacetaldehyde, that is, 1-amino-2,2-diethoxyethane and potassium thiocyanate in the presence of aqueous mineral acid, for example, hydrochloric acid. The intermediate thiourea which forms cyclizes when the reaction is heated. Substituted 2-mercaptoimidazoles are prepared according to the Wohl-Markwald synthesis by reaction between an amino ketone and potassium thiocyanate. The reaction conditions may be identical with the procedure previously described, that is, reaction in the presence of mineral acid and cyclization by heating of the intermediate thiourea. The sodium salt is readily formed by reaction with sodium carbonate, bicarbonate or hydroxide in accordance with standard procedures.

The reaction between the sodium salt of 2-mercaptoimidazole and the alkyl or alkenyl halide will be described more fully hereinafter.

The alkyl and alkenylmercaptopyrimidines of this invention are formed by reaction between a sodium salt of 2-mercaptopyrimidine and an alkyl or alkenyl halide. The necessary 2-mercaptopyrimidines are formed by methods well known in the art. Reaction between thiourea and acetyl acetone as described by Price and Moos in the Journal of the American Chemical Society, vol. 67, page 207, yield 2-mercapto-4,6-dimethylpyrimidine. Reaction between thiourea and diethylmalonate according to the same procedure described by Dickey and Gray for the preparation of barbituric acid in Org. Syntheses, Coll. vol. 2, page 60 (1943), yields thiobarbituric acid. This compound in turn can be converted to 4,6-dichlorothiobarbituric acid by reaction with phosphorus oxychloride, and this compound in turn is converted to 2-mercaptopyrimidine by reduction with zinc dust. These latter two reactions are well known and have been described in the chemical literature.

An article appearing in the Journal of General Chemistry of the U.S.S.R., 27, 1276 (1957) describes an excellent method for the preparation of 2-mercaptopyrimidine by reaction between equimolar portions of a 1,1,3,3-tetraalkoxypropane and thiourea in the presence of about a 100% molar excess of concentrated hydrochloric acid at approximately 25° C.

The sodium salt is prepared as described above.

The reaction between an alkyl halide and a sodium salt of 2-mercaptoimidazole or 2-mercaptopyrimidine takes place under conditions well known to those skilled in the art. For example, the reactants can be heated in an ether solvent such as diethyl or dibutyl ether at a temperature of from about 35° C. to about 140° C. for a period of from about one to about five hours. The sodium halide which forms precipitates and is removed by filtration. The desired product is recovered by removal of the solvent, usually by distillation in vacuo. The addition of a minor proportion of sodium iodide may be helpful to catalyze the reaction.

It will be noted that this reaction produces free bases. Acid addition salts and quaternary salts are prepared as described below.

The compounds within the scope of this invention wherein the adjacent carbon atoms in the heterocyclic moiety form a saturated chain, that is, the imidazolines, the tetrahydropyrimidines, the tetrahydrodiazepines and diazacyclooctenes are all prepared by reaction between an alkyl or alkenyl halide and the appropriate 2-mercapto compound. This compound in turn is prepared from carbon disulfide and a diaminoalkane in accordance with known reactions. For the preparation of an imidazoline, the selected diaminoalkane is a 1,2-diaminoethane, for the tetrahydropyrimidine it is a 1,3-diaminopropane, for the tetrahydrodiazepine it is a 1,4-diaminobutane and for the diazacyclooctene it is a 1,5-diaminopentane. N-substituted compounds within the purview of this invention can be prepared by selecting an alkylaminoalkane as the starting compound.

It is also possible to prepare compounds in which the adjacent carbon atoms are substituted with other substituents such as alkyl groups containing up to four carbon atoms, cyano groups, halogen atoms or hydroxyl groups by selecting an appropriately substituted diaminoalkane or alkylaminoalkane. In fact, the alkyl or alkenyl halide itself may be substituted provided only that the substituent does not interfere with the course of the reaction. Thus, if an alkyl or alkenyl dihalide is selected to carry out the reaction, it is apparent that more than one product can result. Hydroxyl groups, cyano groups, ester groups and ether groups on the other hand will not interfere with the reaction. Although many of these substituted compounds, as well as comparably substituted imidazoles and pyrimidines appear to have comparable activity, they are not generally preferred because in many instances they are somewhat more difficult to prepare and are more costly.

For the reaction of an alkyl or alkenyl halide and a 2-mercapto-heterocyclic compound having a saturated carbon chain equimolar quantities of each reactant can be used. It is, however, generally preferred to use an excess of the halide since this leads to better yields. An excess of nitrogen containing heterocycle is not to be preferred since this excess is quite difficult to remove from the reaction product. An excess of up to 15% of alkyl or alkenyl halide gives suitable yields but in special instances, it may be desirable to use as much as a 100% excess of the halide.

Suitable solvents for carrying out the reaction include polar lower aliphatic oxygenated solvents such as ketones, alcohols or esters. These include, for example, acetone, methylisopropyl ketone, methylethyl ketone, methylisobutyl ketone, methanol, ethanol, propanol, ethyl acetate, ethyl propionate, butyl acetate and other obvious equivalents. Generally the solvent chosen will be one which boils at atmospheric pressure at the temperature selected for carrying out the reaction. The preferred solvents include methanol and ethanol since these generally provide a good yield of product and boil at atmospheric pressure within the desired reaction temperature range.

The temperature at which the reaction will be carried out varies somewhat with the reactivity of the compounds. Thus alkyl or alkenyl iodides are more reactive than the corresponding fluorides and reactions employing the fluoride will be carried out at higher temperatures. Branched chain halides where the branching is within two carbon atoms of the halogen atom are more reactive than straight chain halides and reactions employing these will similarly be carried out at lower temperatures. Lower temperatures should be used with this type of halide to avoid decreased yield due to dehydrohalogenation. Generally temperatures between about 60° C. and 150° C. are found to be suitable. It is preferred to employ temperatures between 60 and 75° C. when a solvent is used since most reactants form products at a reasonable time interval at these temperatures. Solvents which boil in this temperature range are readily available and being lower boiling solvents they are more readily removed.

The time of reaction will likewise vary with the reactivity of the compounds. The more active compounds will form products in a relatively short time as, for example, 1 to 8 hours and others may require as long as 16 hours. Thus, although some product is undoubtedly formed immediately upon mixing, suitable yields are usually obtained during a period of from 1 to 16 hours. With the preferred solvents and employing the preferred temperature range, excellent yields of products are generally obtained during a period of from 2 to 6 hours.

In summary, the reaction between an alkyl or alkenyl halide and a 2-mercapto-heterocyclic compound having a saturated carbon chain takes place preferably in methanol or ethanol at a temperature of from 60 to 75° C. during the period of from 2 to 6 hours using up to a 15% excess of the halide.

This reaction can also be used to prepare the imidazoles and pyrimidines of this invention. However, it is preferred to use the previously described method since it requires a shorter reaction period.

The product obtained in this reaction is an acid addition salt. It can be isolated by cooling the reaction mixture but it is generally preferred to isolate pure product in high yield by evaporating the solvent, usually in vacuo, and triturating the resulting residue with ice cold ether or a hydrocarbon solvent such as hexane.

It has also been found convenient to prepare the compounds of the instant invention while boiling away the solvent. The reactants are generally products which are difficultly miscible with each other. It, therefore, aids in the reaction to use a solvent of the type described above, but the only function of the solvent is to bring the reactants into contact with each other. The solvent does this by containing them in the same solution. However, once the desired temperature of reaction has been attained, the solvent may be evaporated without detrimental effect to the yield of product. In carrying out a reaction under these conditions the reactants will be taken up in a suitable solvent of the nature described above. Reaction will be initiated by heating and the reaction will be carried out in a vessel which will allow for the escape of solvent vapor. There results, after all of the solvent has evaporated, a viscous mass containing reaction product and reactants, and these reactants will continue to form reaction product while the reaction temperature is maintained. When the reaction is carried out in this way, it has been found that the optimum temperature is somewhat higher than when a solvent is used. The optimum temperature for carrying out the reaction once the solvent has been removed is about 90° C. to about 100° C.

When reaction is complete, the product is allowed to cool whereupon it solidifies. The solid is broken up and triturated with ether or a hydrocarbon solvent and the desired product is obtained in good yield and high purity.

The reactions described above are used for the preparation of halogen acid addition salts. The free bases can be obtained from these addition salts by procedures well known in the art. It is convenient, for example, to dissolve or suspend the acid addition salt in water and to neutralize with an alkaline reagent, for example, an oxide, hydroxide, carbonate or bicarbonate of an alkali metal or alkaline earth metal. These include sodium hydroxide, barium hydroxide, calcium oxide, potassium carbonate, sodium bicarbonate, etc. The free base may be recovered by filtration. However, generally better yields are obtained if the solution or suspension is extracted with a hydrocarbon or halogenated hydrocarbon solvent containing up to 7 carbon atoms such as methylene chloride, ethylene chloride, chloroform, carbon tetrachloride, benzene, hexane, petroleum ether, etc. The organic solvent is dried over an anhydrous drying agent such as anhydrous magnesium sulfate and the solvent evaporated in vacuo to give the desired product.

It should be pointed out that certain of the acid addition salts of this invention are insoluble in water, apparently because of their high molecular weight. In this event it may be desirable to add certain water miscible solvents such as methanol or ethanol to aid in taking the acid addition salt into solution during the preparation of the free base. Alternatively, an insoluble acid addition salt may be simply suspended in water which then is treated with an alkaline reagent and an insoluble free base is formed.

These reactions can also be used to prepare lower alkyl and alkenylmercapto compounds, for example, the methyl mercapto compound. However, these compounds are not active unless, as noted above, a nitrogen atom in the heterocyclic moiety is substituted with an alkyl or alkenyl group with the required number of carbon atoms.

As stated above, it is also intended to include within the purview of this invention alkoxy and alkenyloxy compounds in addition to the mercapto compounds whose preparation has been described. These oxygenated compounds can all be prepared in accordance with known reactions. The alkoxy and alkenyloxy compounds in which the adjacent carbon atoms in the heterocyclic moiety form part of a conjugated system, that is, the imidazoles and the pyrimidines, are prepared by reacting an alkyl or alkenyl halide with the sodium salt of the selected 2-hydroxyimidazole or pyrimidine. The preparation of these well known compounds is described in numerous articles appearing in the chemical literature. The alkoxy and alkenyloxy compounds in which the adjacent carbon atoms in the heterocyclic moiety forms a saturated chain are prepared by reaction between a sodium alkoxide or alkenyloxide bearing an alkoxy or alkenyloxy group of the appropriate length and the selected methylmercapto compound.

The reaction between an alkyl or alkenyl halide and the sodium derivative of the imidazole or pyrimidine takes place in an ether solvent, for example, diethyl or dibutyl ether at a temperature of from about 35° C. to about 140° C. during a period of from about one to about five hours. The reaction is most simply carried out by refluxing the reactants in the selected solvent for the reaction period. The sodium halide which forms precipitates and is removed by filtration. The desired product is recovered by removal of the solvent, usually by distillation in vacuo.

Reaction between the methylmercapto compound and sodium alkoxide or alkenyloxide takes place under approximately the same conditions as described above except that usually the reaction temperature will be somewhat higher, that is, from about 60° C. to about 140° C. It may also be helpful to add a hydrocarbon solvent such as benzene to the ether solvent to aid in dissolving the reactants and to provide a higher boiling solvent mixture. The sodium methyl mercaptan which forms as a by-product of the reaction may be somewhat soluble in the reaction mixture, but it can be removed by concentrating the solution to cause it to precipitate and then removing the precipitate.

It is also possible to carry out each of these reactions without the use of a solvent. In each case most of the by-product will precipitate and can be removed by filtration. It can be completely removed by taking up the mixture in water, neutralizing with dilute acid and extracting the free base with ether. The ether is then removed by distillation.

In the discussion given above of the compounds within the purview of the instant invention it was pointed out that it is intended to include specifically acid addition salts. For certain applications it may be desirable to utilize acid addition salts other than halogen acid addition salts prepared in accordance with certain of the reactions described above. For example, it may be desirable to prepare sulfate, nitrate, phosphate, citrate, gluconate or tartrate acid addition salts. These may be prepared by procedures well known to those skilled in the art. One method which is highly useful with water soluble acid addition salts comprises contacting the halogen acid addition salt with the acid form of a basic anion resin such as the highly basic compounds provided by the Rohm and Haas Co. under the trade name Amberlite IRA-400. This resin is a polyquaternary ammonium compound which is prepared by chloromethylating a highly cross-linked copolymer of styrene and divinyl benzene followed by treatment of the chloromethylated material with a tertiary amine such as trimethylamine. To prepare a tartrate, for example, the resin is first contacted with an aqueous tartaric acid solution and an anion exchange takes place converting the quaternary halide to the tartrate. The tartrate resin is then contacted with a halogen acid addition salt of this invention and a further ion exchange takes place converting any halogen acid addition salt to the tartrate and leaving the halide ion on the resin. The tartrate salt can then be recovered from the eluate by a number of methods, as, for example, evaporation or solvent precipitation. This same procedure can be used to prepare sulfate, nitrate, phosphate, citrate, acetate and other acid addition salts.

Another procedure which is useful is to take up the free base in an anhydrous solvent such as ether and to bubble in an anhydrous reagent such as hydrogen chloride or hydrogen bromide.

Other acid addition salts can be prepared by dissolving the free base in methanol or ethanol and adding an excess of concentrated aqueous acid such as nitric or phosphoric. The acid addition salt forms and can be recovered by evaporating the solvent. The presence of a small amount of benzene or ether may aid in dissolving the free base.

This procedure is especially useful with the aromatic compounds of this invention, that is, the imidazoles and pyrimidines.

A quaternary alkyl ammonium halide of this invention can be prepared in the usual manner. Thus, a methanol or ethanol solution is prepared containing at least a molar equivalent and preferably an excess of an alkyl halide having up to four carbon atoms in the alkyl group together with the compound to be quaternized, the latter in the form of a free base. The desired compound will generally form by allowing the reactants to stand at from about 20° C. to about 30° C. for from about one to about twenty-four hours. Reaction may be hastened by refluxing. Quite often the quaternary compound precipitates as it is formed, but certain of them are at least partially soluble in the reaction solvent and best yields are obtained by removing the solvent, for example, by distillation in vacuo.

The procedure described above utilizing basic anionic resins in connection with the preparation of acid addition salts can also be used to prepare other quaternary salts. Thus, for the preparation of a quaternary alkyl ammonium tartrate a quaternary alkyl ammonium halide will be contacted with a resin previously treated with aqueous tartaric acid. This procedure is utilized to prepare other quaternary alkyl ammonium salts such as the acetate, propounds of this invention, that is, the imidazoles and pyrimidines.

As stated above, the compounds of this invention are useful in the treatment of plant pathogens. They can be utilized in the control of phytopathogenic fungi including Fusaria which causes wilts. They are particularly useful in the control of rusts caused by obligate parasites.

Wilts are among the most difficult plant diseases to control. Included in the Fusaria caused infections in plants are tomato wilts (*F. oxysporum* f. *lycopersici*); cotton wilt (*F. oxysporum* f. *vasinfectum*); watermelon wilt (*F. oxysporum* f. *niveum*); flax wilt (*F. oxysporum* f. *lini*); cabbage yellows (*F. oxysporum* f. *conglutinans*); banana wilt (*F. oxysporum* f. *cubense*); celery yellows (*F. oxysporum* f. *apii*); pea wilt (*F. oxysporum* f. *pisi*); pea semi wilt (*F. oxysporum* f. *pisi*); muskmelon wilt (*F. oxysporum* f. *melonis*); aster wilt (*F. oxysporum* f. *callistephi*); broad bean wilt (*F. oxysporum* f. *fabae*); and stock wilt (*F. oxysporum* f. *mathioli*). In controlling Fusaria caused disease, the chemical agent of this invention satisfies a long-felt and most important agricultural need. Heretofore in many cases, the only effective control for diseases of this type has been to develop Fusaria-resistant strains of the plants. For example, J. C. Walker in Plant Pathology, McGraw-Hill Book Co., Inc., 1950, states that the only practical means of controlling tomato wilt is by the use of resistant varieties of tomatoes. He further states that cabbage yellow is successfully controlled by the use of resistant varieties.

The successful treatment of obligate parasites is an especially insidious problem. Obligate parasites are parasites which will grow only on specific living hosts and will not grow under any other conditions. They are often so specific in their genetic requirements that they will grow only on plants of a particular species. Since they must be on living hosts during their life cycle it appears that they have lost many of their biosynthetic capacities and are directly dependent on living cells to furnish these deficiencies. In other words, the very metabolic pathways which are necessary to the life of the plant are also necessary to the life of the parasite. It is apparent, therefore, that any agent that is capable of killing the parasite is potentially capable of killing the plant. In eradicating obligate parasites the parasiticides interferes with a metabolic pathway and/or pathways of the parasite. Some of these pathways the parasite will have in common with the host. In this event the parasiticide must be so specific in its action that it does not interfere with the metabolism of the host to such an extent as to be fatal. Furthermore, since the organism will not grow in artificial media it is necessary to carry out all testing in vivo. Rusts are a diseased condition of plants caused by a class of obligate parasites.

When these facts are considered, it will be apparent that the discovery of the remarkable activity of the compounds of this invention in the control of wilts and rusts is a most important contribution to the art.

The following experiment is presented to show the use of compounds of this invention in the control of Fusaria. Approximately 10 day old tomato plants were pulled from the soil, the roots washed in running water and then dipped into a suspension of spores of *Fusarium lycopersici*, the fungus usually implicated in tomato wilt. These were divided into two groups and a third non-infected group was used as a control. One week was allowed for germination of spores, growth of microorganisms and infection of the plants to take place. One of the infected groups was then treated by pouring a mixture containing 0.05% to 2 - dodecylmercapto-1,4,5,6-tetrahydropyrimidine hydrobromide in 2% acetone-water onto the soil. A comparison was then made among the three groups. It was found that the presence of the disease is manifested in the infected but untreated plants by various gradations of chlorosis, stunting and vascular discolorations. The group of infected and treated plants on the other hand returned to normal growth and compared favorably with the uninfected and untreated control. Similar results were obtained with other compounds of this invention.

The following experiment is presented to show the unusually high order of activity of the compounds of this invention in the control of rusts. A group of bean plants harboring a very heavy infection of bean rust caused by exposing the plants to the activity of the obligate parasite *Uromyces phaseoli* (formerly *U. appendiculatus*) was divided into two smaller groups. One group was treated by spraying with an acetone-water solution containing 400 parts per million of 2-dodecylmercapto-1,4,5,6-tetrahydropyrimidine hydrobromide and a second group was sprayed with an acetone-water solution containing no active agent. This latter group served as a control. It was found that at the end of three days, the disease had completely disappeared from those plants sprayed with the active agent of this invention. Similarly, plants sprayed with mixtures containing as little as 80 parts per million of this same active compound were found to be completely free of infection. The control plants completely deteriorated. No injury to the plant was observed during the treatment.

Active agents of this invention can be used alone, but as illustrated above, their activity is of such a high order that they will almost always be used in the form of compositions which may contain as little as 0.001% of active agent dispersed in a suitable agricultural extending agent. The infected plants to be treated with compounds of this invention may be contacted by any of the various means common to agricultural practice including spraying, dusting, soil infusion or injection.

The term, "extending agents" as used herein include any and all of the usual economically practical, commercially available extending agents commonly used in the agricultural field. It includes, therefore, the solvents of a true solution, the liquid phase of suspensions, emulsions or aerosols, the semi-solid carrier of ointments and the solid phase of dust and powders. These agents should, of course, be non-toxic to the plants at the levels employed and chemically inert towards the active compounds.

It has been found that the compounds of this invention are effective when dispersed in an extending agent at concentrations of 0.001% by weight or even lower. This concentration is effective when the dispersing agent is liquid but it is preferred, although not necessary, to use more concentrated mixtures when the dispersing agent is a semi-solid or a solid. This is because liquid dispersions which are, of course, suitable for use as sprays or injectable solutions give more intimate contact of the active material with the plant and, therefore, are more effective at lower concentrations.

There are a number of liquid media which can be utilized for the preparation of solutions, suspensions or emulsions of compositions containing an active agent of this invention. High boiling oils of vegetable origin such as castor oil or olive oil are suitable. Low boiling, more volatile solvents such as acetone, cyclohexane, carbon tetrachloride, ethylene dichloride, tetrachloroethane, hydrogenated naphthalenes, and the like are also useful. For certain applications it may be advantageous to resort to mixtures of solvents. If the active agent is to be applied in an aerosol, it is convenient to dissolve it in a suitable solvent and to disperse the resulting solutions in a liquid such as Freon. For such applications it has been found that it is better to employ true solutions of the active agents although it is possible to employ suspensions or emulsions.

An active agent of this invention will often be dispersed either in the form of emulsions or suspensions in an inert carrier such as water with the aid of a capillary active substance. Such capillary substances may be anion-active, cation-active or non-ionic. There may be mentioned by way of example natural or synthetic soaps, Turkey-red oil (sulfonated castor oil), fatty alcohols, sulfonates, esters of fatty acids and the like. Other examples include high molecular weight ammonium compounds as well as condensation products of ethylene and propylene oxide with monohydric and polyhydric alcohols. For use as a powder or dust the compound or compounds of this invention can be formulated using any of a number of extending agents either organic or inorganic in nature which are suitable for the manufacture of pulverulent preparations. These include, for example, calcium carbonate, kaolin, bole, kieselguhr, talcum, casein, magnesium carbonate, boric acid and others. Materials of vegetable origin such as powdered cork, powdered wood and powdered walnut shells are also useful. These compositions may be used in the dry form, or by the addition of wetting agents. The dried powder can be rendered wettable by water so as to obtain stable aqueous dispersions suitable for use as sprays.

For special purposes, it would be advantageous to prepare anti-phytopathogenic compositions in the form of a paste or an ointment by the use of a semi-solid extending agent such as soap or petroleum jelly with or without the aid of solubility promoters and/or dispersing agents.

In all of the forms described above, the dispersions may be provided ready for use or they may be provided in a concentrated form suitable for mixing with other extending agents at the time of application.

It is sometimes advantageous to have other active agents, for example, bactericides or insecticides such as pyrethrum, streptomycin, oxytetracycline, D.D.T. (dichlorodiphenyltrichloroethane), malathion or chlordane in the same composition which contains the compound or compounds of this invention. A composition of this nature has the advantage that two or more active agents can be distributed in one and the same application.

The agents of the present invention are useful in the control of animal pathogens including those which attack humans. It has been found for example that the minimum inhibitory concentration of the compound 2-dodecylmercapto-1,4,5,6-tetrahydropyrimidine hydrobromide when tested by the standard agar incorporation technique against microorganism *Trichophyton rubrum* is only 10 mcg./ml. Similar results are obtained not only against *Trichophyton rubrum* but also against *Micrococcus pyogenes* var. *aureus* and *Escherischeae coli*. The compounds have also proved to be active against a variety of helminths including *Hymenolepis nana, Nematosporoides dubius* and *Syphacia obvelata*, and when used for this application, they may be administered alone or with pharmaceutically acceptable excipients. The dosage range is of the same order of magnitude as has been found useful with piperazines and other anthelmintic agents.

The following examples are given solely for the purpose of illustration and are not to be construed as limitations of this invention, many apparent variations of which are possible without departing from the spirit or scope thereof.

*Example I.—2-hexylmercapto-1,4,5,6-tetrahydropyrimidine hydrobromide*

A solution containing 0.05 mol of hexyl bromide and 0.05 mol of 2-mercapto-1,4,5,6-tetrahydropyrimidine in 200 ml. of methanol was refluxed for ten hours. The solution was evaporated on a steam bath to leave a residue. The residue was triturated with ice cold ether and the ether evaporated to leave the desired product as an oil.

*Example II.—2-octylmercapto-1,4,5,6-tetrahydropyrimidine hydrobromide*

A solution containing 0.51 mol of octyl bromide and 0.05 mol of 2-mercapto-1,4,5,6-tetrahydropyrimidine in 100 ml. of ethanol was refluxed for 3 hours. The solution was evaporated in vacuo, the residue was triturated with ether and the ether evaporated in vacuo to leave the desired product as an oil.

*Example III.—2-decylmercapto-1,4,5,6-tetrahydropyrimidine hydriodide*

A solution containing 0.10 mol of decyl iodide and 0.05 mol of 2-mercapto-1,4,5,6-tetrahydropyrimidine in 200 ml. of acetone was refluxed for 16 hours. The solution was evaporated in vacuo to remove the solvent. The residue was triturated in ice cold ether and the ether removed to leave the desired product as a residue.

*Example IV.—2-decylmercapto-1,4,5,6-tetrahydropyrimidine hydrobromide*

A solution containing 0.07 mol of decyl bromide and 0.05 mol of 2-mercapto-1,4,5,6-tetrahydropyrimidine in 200 ml. of methanol was refluxed for 16 hours. The solution was evaporated on a steam bath to leave a residue which solidified on cooling. The residue was broken up and triturated with ether, the ether removed by filtration and the product air dried, M.P. 50–52° C.

*Example V.—2-dodecylmercapto-1,4,5,6-tetrahydropyrimidine hydrobromide*

A solution containing 0.05 mol of dodecyl bromide and 0.05 mol of 2-mercapto-1,4,5,6-tetrahydropyrimidine in a mixture of 100 ml. of acetone and 200 ml. of methanol was refluxed for six hours. The solution was evaporated on a steam bath to leave a residue consisting of a yellow oil. The oil was triturated in ice cold ether whereupon it crystallized. It was collected by filtration and air dried to yield the desired product, M.P. 55–60° C.

*Example VI.—2-tetradecylmercapto-1,4,5,6-tetrahydropyrimidine hydrobromide*

A solution containing 0.05 mol of tetradecyl bromide and 0.05 mol of 2-mercapto-1,4,5,6-tetrahydropyrimidine in 200 ml. of methylisobutyl ketone was refluxed for 4 hours. The solvent was removed in vacuo and the residue triturated with ice cold hexane to yield the desired product M.P. 68–71° C.

*Example VII.—2-hexadecylmercapto-1,4,5,6-tetrahydropyrimidine hydrobromide*

A solution containing 0.05 mol of hexadecyl bromide and 0.04 mol of 2-mercapto-1,4,5,6-tetrahydropyrimidine in 150 ml. of ethyl acetate was refluxed for 2 hours. The solution was evaporated on a steam bath, the residue cooled and triturated with ice cold ether and the product recovered by filtration. The air dried product melted at 79–81° C.

*Example VIII.—2-octadecylmercapto-1,4,5,6-tetrahydropyrimidine hydrobromide*

A solution containing 0.036 mol of octadecyl bromide and 0.035 mol of 2-mercapto-1,4,5,6-tetrahydropyrimidine in 100 ml. of ethanol was heated at about 40° C. for about 20 minutes whereupon a clear solution resulted. The temperature was then increased to a temperature at which the ethanol slowly boiled out of the reaction mixture. The mixture remained clear and was heated at a temperature of from 95 to 100° C. for three hours. It was allowed to cool and the crystals which formed were triturated with ether. The desired product was recovered by filtration and air dried, M.P. 83–85° C.

*Example IX.—2-heptylmercapto-1,4,5,6-tetrahydropyrimidine hydrofluoride*

A solution containing 0.03 mol of heptyl fluoride and 0.028 mol of 2-mercapto-1,4,5,6-tetrahydropyrimidine in 75 ml. of ethanol was refluxed for ten hours. The solution was evaporated on a steam bath, the residue triturated with ice cold hexane and the hexane removed to leave the desired product as a residue.

*Example X.—2-(2-octenylmercapto)-1,4,5,6-tetrahydropyrimidine hydrobromide*

A solution containing 0.05 mol of 1-bromo-octene-2 and 0.05 mol of 2-mercapto-1,4,5,6-tetrahydropyrimidine in 80 ml. of ethanol was refluxed for four hours. The solution was evaporated in vacuo and the residue triturated with ice cold ether. The desired product was recovered as a residue following removal of the ether.

*Example XI.—2-(2,3-dimethyl-decylmercapto)-1,4,5,6-tetrahydropyrimidine hydrobromide*

A solution containing 0.05 mol of 2,3-dimethyl-1-bromo-decane and 0.05 mol of 2-mercapto-1,4,5,6-tetrahydropyrimidine in 80 ml. of ethanol was refluxed for four hours. The solution was evaporated in vacuo and the residue triturated with ice cold ether. The desired product was recovered as a residue following removal of the ether.

*Example XII.—2-octadecylmercapto-1,4,5,6-tetrahydropyrimidine hydriodide*

A solution containing 0.05 mol of octadecyl iodide and 0.05 mol of 2-mercapto-1,4,5,6-tetrahydropyrimidine in 110 ml. ethanol was heated at 40° C. for about ½ hour whereupon a clear solution formed. The ethanol was then boiled off by increasing the temperature of the reaction mixture to about 78° C. The residue was heated at 100° C. for one hour and cooled. The residue was triturated with ether and the desired product recovered by removal of ether. It was air dried and melted at 74–76° C.

*Example XIII.—2-tetradecylmercapto-1,4,5,6-tetrahydropyrimidine*

2 - tetradecylmercapto-1,4,5,6-tetrahydropyrimidine hydrobromide (0.089 mol) was dissolved in 400 ml. of 1:1 mixture of methanol and water. The solution was poured with stirring into an aqueous solution of 3.65 g. of sodium hydroxide in 2.5 liters of water. A waxy crystalline solid precipitated. The mixture was filtered, the solid washed with water and air dried to yield the desired product melting at 69–71° C.

*Example XIV.—2-tetradecylmercapto-1,4,5,6-tetrahydropyrimidine nitrate*

The product of the previous example (0.064 mol) was dissolved in 15 ml. of methanol. To this solution was added dropwise a solution of 0.40 ml. of concentrated nitric acid in 1.6 ml. of water. The resulting solution was evaporated to dryness at reduced pressure. The residue was triturated with ether and the mixture filtered to isolate the desired product.

*Example XV.—2-tetradecylmercapto-1,4,5,6-tetrahydropyrimidine hydrochloride*

A solution containing 0.05 mol of tetradecyl chloride and 0.05 mol of 2-mercapto-1,4,5,6-tetrahydropyrimidine in 200 ml. of methylisobutyl ketone was refluxed for four hours. The solvent was removed in vacuo and the residue triturated with ice cold hexane to yield desired product.

*Example XVI.—2-(2-hexenylmercapto)-1,4,5,6-tetrahydropyrimidine hydrobromide*

A solution containing 0.05 mol of 1-bromo-hexene-2 and 0.05 mol of 2-mercapto-1,4,5,6-tetrahydropyrimidine in 80 ml. of ethanol was refluxed for four hours. The solution was evaporated in vacuo and the residue triturated with ice cold ether. The desired product was recovered as a residue following removal of ether.

*Example XVII.—2-(2-octadecenylmercapto)-1,4,5,6-tetrahydropyrimidine hydrobromide*

A solution containing 0.05 mol of 1-bromo-octadecene-2 and 0.05 mol of 2-mercapto-1,4,5,6-tetrahydropyrimidine in 80 ml. of ethanol was refluxed for four hours. The solution was evaporated in vacuo and the residue triturated with ice cold ether. The desired product was recovered as a residue following removal of the ether.

*Example XVIII.—2-hexylmercapto-N-methyl-1,4,5,6-tetrahydropyrimidine hydrobromide*

A solution containing 0.05 mol of hexyl bromide and 0.05 mol of 2-mercapto-N-methyl-1,4,5,6-tetrahydropyrimidine in 200 ml. of methanol was refluxed for ten hours. The solution was evaporated on a steam bath to leave a residue. The residue was triturated with ice cold ether and the ether evaporated to obtain the desired product.

*Example XIX.—2-methylmercapto-N-hexyl-1,4,5,6-tetrahydropyrimidine hydrobromide*

A solution containing 0.51 mol of octyl bromide and 0.05 mol of 2-mercapto-N-hexyl-1,4,5,6-tetrahydropyrimidine in 100 ml. of ethanol was refluxed for three hours. The solution was evaporated in vacuo, the residue triturated with ether and the ether removed to obtain the desired product.

*Example XX.—2-decylmercapto-N-propyl-5-methyl-1,4,5,6-tetrahydropyrimidine hydriodide*

A solution containing 0.10 mol of decyl iodide and 0.05 mol of 2-mercapto-5-methyl-1,4,5,6-tetrahydropyrimidine in 200 ml. of acetone was refluxed for sixteen hours. The solution was evaporated in vacuo. The residue was triturated in ice cold ether and the solution evaporated in vacuo to leave the desired product as a residue.

*Example XXI.—2-hexylmercaptoimidazole*

A solution containing 0.07 mol of hexyl iodide and 0.05 mol of the sodium salt of 2-mercaptoimidazole in 200 ml. of ethanol was refluxed for five hours. The mixture was filtered and the filtrate evaporated on a steam bath to leave a residue which was triturated with ether and the ether removed to leave the desired product.

*Example XXII.—2-octadecylmercaptoimidazole*

A solution containing 0.05 mol of octadecyl chloride and 0.05 mol of the sodium salt of 2-mercaptoimidazole in a mixed solvent comprising 100 ml. of an acetone and 200 ml. of methanol was refluxed for six hours. The mixture was filtered and the filtrate evaporated on a steam bath. The residue was triturated with ice cold ether and the ether removed to leave the desired product.

*Example XXIII.—2-decylmercapto-4-methylimidazole*

A solution containing 0.05 mol of decyl bromide and 0.05 mol of the sodium salt of 2-mercapto-4-methylimidazole in 200 ml. of methylisobutyl ketone was refluxed for four hours. The mixture was filtered and the solvent removed in vacuo. The residue was triturated with ice cold hexane and the hexane removed to leave the desired product.

The procedures of the preceding examples were utilized to prepare a series of free bases which were then converted to the following acid addition salts by reaction with hydrogen bromide.

2-undecylmercaptoimidazole hydrobromide—melting point, 104 to 105° C.
Dodecylmercaptoimidazole hydrobromide—melting point, 118 to 120° C.
2-heptylmercaptoimidazole hydrobromide—melting point, 102 to 104° C.
2-decylmercaptoimidazole hydrobromide—melting point, 117 to 118° C.
2-tridecylmercaptoimidazole hydrobromide—melting point, 119 to 125° C.
2-tetradecylmercaptoimidazole hydrobromide—melting point, 121 to 123° C.
2-octadecylmercaptoimidazole hydrobromide—melting point, 126, to 127° C.
2-nonylmercaptoimidazole hydrobromide—melting point, 105 to 107° C.

*Example XXIV.—2-undecyl-10-enylmercaptoimidazole hydrobromide*

A solution containing 0.05 mol of undecyl-10-enylbromide and 0.05 mol of 2-mercaptoimidazole in 200 ml. of methanol was refluxed for ten hours. The solution was evaporated on a steam bath and the residue triturated with ice cold ether. The ether was evaporated to leave the desired product; melting point 101–103° C.

*Example XXV.—2-nonylmercaptoimidazole hydrofluoride*

A solution containing 0.03 mol of nonyl fluoride and 0.03 mol of 2-mercaptoimidazole in 75 ml. of ethanol was refluxed for ten hours. The solution was evaporated on a steam bath, the residue triturated with ice cold hexane and the hexane removed to leave the desired product as a residue.

*Example XXVI.—2-tetradecylmercapto-N-methylimidazole hydochloride*

A solution containing 0.05 mol of tetradecyl chloride and 0.05 mol of 2-mercapto-N-methylimidazole in 50 ml. of ethanol was refluxed for eight hours. The solution was evaporated on a steam bath, the residue triturated with ice cold ether and the ether removed to leave the desired product as a residue.
2 - tetradecylmercaptoimidazole hydrobromide—melting point, 121 to 123° C.
2 - octadecylmercaptoimidazole hydrobromide—melting point, 126 to 127° C.
2-nonylmercaptoimidazole hydrobromide—melting point, 105 to 107° C.

*Example XXIV.—2-undecyl-10-enylmercaptoimidazole hydrobromide*

A solution containing 0.05 mol of undecyl-10-enylbromide and 0.05 mol of 2-mercaptoimidazole in 200 ml. of methanol was refluxed for ten hours. The solution was evaporated on a steam bath and the residue triturated with ice cold ether. The ether was evaporated to leave the desired product; melting point 101–103° C.

*Example XXV.—2-nonylmercaptoimidazole hydrofluoride*

A solution containing 0.03 mol of nonyl fluoride and 0.03 mol of 2-mercaptoimidazole in 75 ml. of ethanol was refluxed for ten hours. The solution was evaporated on a steam bath, the residue triturated with ice cold hexane and the hexane removed to leave the desired product as a residue.

*Example XXVI.—2-tetradecylmercapto-N-methylamidazole hydrochloride*

A solution containing 0.05 mol of tetradecyl chloride and 0.05 mol of 2-mercapto-N-methylimidazole in 50 ml. of ethanol was refluxed for eight hours. The solution was evaporated on a steam bath, the residue triturated with ice cold ether and the ether removed to leave the desired product as a residue.

*Example XXVII.—2-propylmercapto-N-butylimidazole hydrofluoride*

A solution containing 0.05 mol of propyl fluoride and 0.05 mol of 2-mercapto-N-butylimidazole in 100 ml. of ethanol was refluxed for three hours. The solution was evaporated on a steam bath, the residue triturated with ice cold ether and the ether removed to leave the desired product as a residue.

*Example XXVIII.—2-octadecylmercapto-4-ethylimidazole*

A solution containing 0.1 mol of octadecyl chloride and 0.1 mol of the sodium salt of 2-mercapto-ethylimidazole in 200 ml. of ether was refluxed for fifteen hours. The mixture was filtered and the filtrate evaporated on a steam bath. The residue was triturated with ice cold ether and the ether removed to leave the desired product as a residue.

*Example XXIX.—2-heptylmercaptopyrimidine*

A solution containing 0.36 mol of heptyl bromide and 0.36 mol of the sodium salt of 2-mercaptopyrimidine in 250 ml. of ether was refluxed for six hours. The mixture was filtered and the filtrate evaporated on a steam bath. The residue was triturated with ice cold ether and the ether removed to leave the desired product as an oil.

*Example XXX.—2-hexadecylmercaptopyrimidine*

A solution containing 0.1 mol of hexadecyl iodide and 0.1 mol of the sodium salt of 2-mercaptopyrimidine in 150 ml. of ether was refluxed for five hours. The mixture was filtered and the filtrate evaporated on a steam bath. The residue was triturated with ice cold ether and the ether removed to leave the desired product as a solid melting at 48–50° C.

*Example XXXI.—2-octadecylmercaptopyrimidine*

A solution containing 0.05 mol of octadecyl chloride and 0.05 mol of the sodium salt of 2-mercaptopyrimidine in 100 ml. of ether was refluxed for six hours. The mixture was filtered and the filtrate evaporated on a steam bath. The residue was triturated with ice cold ether and the ether removed to leave the desired product as a residue.

*Example XXXII.—2-mercapto-4,5,6,7-tetrahydro-1,3-diazepine*

To a stirred solution of 0.5 mol of 1,4-diaminobutane in 100 ml. of methanol there was added dropwise 0.51 mol of carbon disulfide in 100 ml. of methanol. Heat was evolved during the addition and the reaction mixture was maintained at approximately 30° C. by cooling. The mixture was allowed to stand at room temperature for six hours and the solid which separated was recovered by filtration and dried in vacuo. The precipitate was suspended in 750 ml. of water and refluxed for 30 minutes. The mixture was cooled to room temperature, the water decanted and the residue extracted with hot ethanol. The ethanol solution was cooled to about 5° C. and the desired product precipitated.

*Example XXXIII.—2-octadecylmercapto-4,5,6,7-tetrahydro-1,3-diazepine hydrobromide*

A solution containing 0.5 mol of octadecyl bromide and 0.5 mol of 2-mercapto-4,5,6,7-tetrahydro-1,3-diazepine in 150 ml. of ethanol was refluxed for six hours. The solution was evaporated on a steam bath, the residue triturated with ice cold ether and the ether removed to leave the desired product as a residue.

*Example XXXIV.—2-hexylmercapto-4,5,6,7-tetrahydro-1,3-diazepine hydrobromide*

A solution containing 0.5 mol of hexyl bromide and 0.5 mol of 2-mercapto-4,5,6,7-tetrahydro-1,3-diazepine in 150 ml. of ethanol was refluxed for six hours. The solution was evaporated on a steam bath, the residue triturated with ice cold ether and the ether removed to leave the desired product as a residue.

*Example XXXV.—2-nonylmercapto-N-(2-butenyl)-4,5,6,7-tetrahydro-1,3-diazepine hydriodide*

A solution containing 0.5 mol of nonyl iodide and 0.5 mol of 2-mercapto-N-(2-butenyl)-4,5,6,7-tetrahydro-1,3-diazepine in 150 ml. of ethanol was refluxed for six hours. The solution was evaporated on a steam bath, the residue triturated with ice cold ether and the ether removed to leave the desired product as a residue.

*Example XXXVI.—2 - (2,3-dimethyl - decylmercapto)-N-ethyl-4,5,6,7-tetrahydro-1,3-diazepine hydrochloride*

A solution containing 0.5 mol of 2,3-dimethyl-decyl chloride and 0.5 mol of 2-mercapto-N-ethyl-4,5,6,7-tetrahydro-1,3-diazepine in 150 ml. of ethanol was refluxed for six hours. The solution was evaporated on a steam bath, the residue triturated with ice cold ether and the ether removed to leave the desired product as a residue.

*Example XXXVII.—2-dodecylmercapto-5-ethyl-4,6,5,7-tetrahydro-1,3-diazepine hydrobromide*

A solution containing 0.5 mol of dodecyl bromide and 0.5 mol of 2-mercapto-5-ethyl-4,5,6,7-tetrahydro-1,3-diazepine in 100 ml. of acetone was refluxed for six hours. The latter product was prepared in accordance with the procedure of Example XXXII from carbon disulfide and 2-methyl-1,4-diaminobutane. The solution was evaporated on a steam bath, the residue triturated with ice cold ether and the ether removed to leave the desired product as a residue.

*Example XXXVIII.—2-nonylmercapto-4,5,6,7-tetrahydro-1,3-diazepine hydrobromide*

A solution containing 0.5 mol of nonyl bromide and 0.5 mol of 2-mercapto-4,5,6,7-tetrahydro-1,3-diazepine in 150 ml. of ethanol was refluxed for six hours. The solution was evaporated on a steam bath, the residue triturated with ice cold ether and the ether removed to leave the desired product as a residue. The product melted at 68 to 71° C.

*Example XXXIX.—2- octylmercapto-4,5,6,7 - tetrahydro-1,3-diazepine hydrobromide*

A solution containing 0.5 mol of octyl bromide and 0.5 mol of 2-mercapto-4,5,6,7-tetrahydro-1,3-diazepine in 150 ml. of ethanol was refluxed for six hours. The solution was evaporated on a steam bath, the residue triturated with ice cold ether and the ether removed to leave the desired product as a residue. The product melted at 104 to 106° C.

*Example XL.—2-mercapto-1,3-diazacyclooctene-2*

To a stirred solution containing 0.260 mol of 1,5-diaminopentane in 100 ml. of methanol there was added dropwise 0.263 mol of carbon disulfide in 100 ml. of methanol. A considerable amount of heat was evolved and the reaction mixture was maintained at approximately 30° C. by external cooling. When most of the carbon disulfide had been added (approximately 30 minutes), an oily layer separated. The oily layer gradually became more viscous and at the end of three hours formed a rubbery solid which was separated by filtration and dried in vacuo. The dried product was suspended in 500 ml. of water and the mixture refluxed for approximately one hour. It was then cooled to room temperature and a mixture of crystals and an oily material separated. The water decanted from the residue, and the layer was extracted with hot ethanol. Crystals formed as the hot extract cooled. These were recovered by filtration and recrystallized from ethanol to give the desired product, melting at 207 to 210° C. with decomposition.

*Example XLI.—2-hexylmercapto-1,3-diazepinecyclopentane-2-hydrochloride*

A solution containing 0.5 mol of hexyl chloride and 0.5 mol of 2-mercapto-1,3-diazacyclooctene-2 in 150 ml. of ethanol was refluxed for six hours. The solution was evaporated on a steam bath, the residue triturated with ice cold ether and the ether removed to leave the desired product as a residue.

*Example XLII.—2-octadecylmercapto-1,3-diazacyclooctene-2-hydriodide*

A solution containing 0.5 mol of octyl iodide and 0.5 mol of 2-mercapto-1,3-diazacyclooctene-2 in 150 ml. of ethanol was refluxed for six hours. The solution was evaporated on a steam bath, the residue triturated with ice cold ether and the ether removed to leave the desired product as a residue.

*Example XLIII.—2-propylmercapto-N-(3-hexenyl)-1,3-diazacyclooctene-2-hydrochloride*

A solution containing 0.5 mol of propyl chloride and 0.5 mol of 2-mercapto-N-(3-hexenyl)-1,3 - diazacyclooctene-2 in 150 ml. of ethanol was refluxed for six hours. The latter compound was prepared in accordance with the procedure of Example XL using the appropriate starting materials. The solution was evaporated on a steam bath, the residue triturated with ice cold ether and the ether removed to leave the desired product as a residue.

*Example XLIV.—2-octylmercapto-4,6-diethyl-1,3-diazacyclooctene-2-hydrobromide*

A solution containing 0.5 mol of octyl bromide and 0.5 mol of 2-mercapto-4,6-diethyl-1,3 - diazacyclooctene - 2 in 150 ml. of ethanol was refluxed for six hours. The latter compound was prepared in accordance with the procedure of Example XL using the appropriate starting materials. The solution was evaporated on a steam bath, the residue triturated with ice cold ether and the ether removed to leave the desired product as a residue.

*Example XLV.—2-hexyloxyimidazole*

The sodium salt of 2-hydroximidazole was prepared in accordance with standard procedures and 0.5 mol of this product was refluxed with an equimolar portion of hexyl bromide in 150 ml. of ether for five hours. At the end of this period, the precipitated sodium bromide was removed by filtration and the desired product recovered by removing the solvent in vacuo.

*Example XLVI.—2-octadecyloxyimidazole*

The sodium salt of 2-hydroxyimidazole was prepared in accordance with standard procedures and 0.5 mol of this product was refluxed with an equimolar portion of hexyl bromide in 150 ml. of di-n-butyl ether for one hour. At the end of this period, the precipitated sodium bromide was removed by filtration and the desired product recovered by removing the solvent in vacuo.

Using the procedures of the preceding examples, the following compounds were prepared.

2-undecyloxyimidazole
2-dodecyloxyimidazole
2-heptyloxyimidazole
2-decyloxyimidazole
2-tridecyloxyimidazole
2-tetradecyloxyimidazole
2-octadecyloxyimidazole
2-nonloxyimidazole 2-decyloxy-4-methylimidazole
2-undecyl-10-enyloxyimidazole
2-tetradecyloxy-4-methylimidazole
2-propyloxy-N-butylimidazole
2-octadecyloxy-4-ethylimidazole
2-heptyloxypyrimidine
2-hexadecyloxypyrimidine
2-octadecyloxypyrimidine

*Example XLVII.—2-hexyloxy-1,4,5,6-tetra-hydropyrimidine*

A solution containing 0.5 mol of 2-methylmercapto-1,4,5,6-tetrahydropyrimidine and 0.5 mol of sodium hexyl oxide in 150 ml. of di-n-butyl ether containing 25 ml. of benzene was refluxed for 3 hours. At the end of this period, the solution was evaporated in vacuo to one quarter of its original volume and filtered. It was then concentrated in vacuo to yield the desired product. A small amount of sodium methyl mercaptan is removed by filtration and the product is further purified by taking up the filtrate in 10% aqueous hydrochloric acid, neutralizing with aqueous sodium hydroxide and extracting with ether. The organic solution is dried over anhydrous sodium sulfate, filtered and the solvent removed in vacuo to yield the desired product.

The following compounds are all prepared using the procedure of Example XLVII.

2-hexyloxy-1,4,5,6-tetrahydropyrimidine
2-octyloxy-1,4,5,6-tetrahydropyrimidine
2-decyloxy-1,4,5,6-tetrahydropyrimidine
2-decyloxy-1,4,5,6-tetrahydro-5-propylpyrimidine
2-dodecyloxy-1,4,5,6-tetrahydropyrimidine
2-tetradecyloxy-1,4,5,6-tetrahydropyrimidine
2-hexadecyloxy-1,4,5,6-tetrahydropyrimidine
2-octadecyloxy-1,4,5,6-tetrahydropyrimidine
2-heptyloxy-1,4,5,6-tetrahydropyrimidine
2-(2-octenyloxy)-1,4,5,6-tetrahydropyrimidine
2-(2,3-dimethyl-decyloxy)-1,4,5,6-tetrahydropyrimidine
2-octadecyloxy-1,4,5,6-tetrahydropyrimidine
2-tetradecyloxy-1,4,5,6-tetrahydro-5-propylpyrimidine
2-(2-hexenyloxy)-1,4,5,6-tetrahydropyrimidine
2-octadecyloxy-4,5,6,7-tetrahydro-1,3-diazepine
2-hexyloxy-4,5,6,7-tetrahydro-1,3-diazepine
2-nonyloxy-N-(2-butenyl)-4,5,6,7-tetrahydro-1,3-diazepine
2-(2,3-dimethyl-decyloxy)-N-ethyl-4,5,6,7-tetrahydro-1,3-diazepine
2-dodecyloxy-5-ethyl-4,5,6,7-tetrahydro-1,3-diazepine
2-nonyloxy-4,5,6,7-tetrahydro-1,3-diazepine
2-octyloxy-4,5,6,7-tetrahydro-1,3-diazepine
2-hexyloxy-1,3-diazepinecyclopentane-2
2-octadecyloxy-1,3-diazacyclooctene-2
2-propyloxy-N-(3-hexenyl)-1,3-diazacyclooctene-2
2-octyloxy-4,6-diethyl-1,3-diazacyclooctene-2

*Example XLVIII.—Preparation of free bases*

The procedure of Example XIII was repeated on all of the halogen acid addition salts prepared in accordance with the preceding examples to prepare the free bases.

*Example XLIX.—Preparation of acid addition salts*

Each of the free bases prepared in accordance with the previous examples was converted to a variety of acid addition salts using standard procedures, for instance, dissolving the free base in ether and forming the acid addition salt by the addition of a water solution containing excess acid. In most instances the acid addition salts precipitated from solution. In the few cases where it did not, it was recovered by evaporating the solvent. The acid addition salts prepared included nitrates, sulfates, phosphates, acetates, propionates, valerates, benzoates, maleates, sulfonates, gluconates, p-toluenesulfonates, and citrates.

*Example L.—Preparation of quaternary ammonium halide salts*

Each of the free bases prepared in accordance with the previous examples was converted to a methyl, ethyl, propyl or butyl quaternary fluoride, chloride, bromide or iodide by refluxing a methanolic solution containing the free base and a 10% excess of the appropriate alkyl halide. In some instances the quaternary compound precipitated on cooling, but whether it did or did not maximum yields were always obtained by removing the solvent in vacuo. These compounds were converted to other quaternary ammonium alkyl salts by contact in water with a basic anion exchange resin previously treated with an aqueous acid. Other salts formed included the tartrate, citrate, gluconate, acetate, valerate, nitrate, sulfate and succinate.

*Example LI*

To a mixture containing 100 g. of pulverized calcium carbonate, 2 g. of olein and one gram slaked lime was added sufficient 2-decylmercapto-1,4,5,6-tetrahydropyrimidine hydrobromide to give a mixture containing 100 parts per million of 2-decylmercapto-1,4,5,6-tetrahydropyrimidine hydrobromide and the mixture was ground in a ball mill. The resulting powder is easily scattered, has good adhesive power and is effective against early and late tomato blight.

*Example LII*

To a mixture containing 25 g. of talcum, 4 g. of sodium dibutyl naphthalene sulfate, 4 g. of casein and 5 g. of sodium carbonate was added sufficient 2-methylmercapto-N hexyl-1,4,5,6-tetrahydropyrimidine to provide a mixture containing 200 parts per million of active agent. The mixture was added to an equal quantity of ground calcium carbonate and the whole thoroughly mixed. This powder may be suspended in water immediately before use and gives a fungicidal suspension which is sufficiently stable for use in spraying applications.

*Example LIII*

A solution is prepared containing 90 parts per million of 2-nonylmercaptoimidazole in carbon tetrachloride. The solution is useful in the treatment of fungal infections by spraying.

*Example LIV*

A mixture is prepared containing 400 parts per million of 2-propylmercapto-N-butylimidazole in a 1:1 mixture of xylene and Turkey-red oil. This solution can be readily emulsified in water and the fungicidal emulsion is suitable as a spray.

*Example LV*

A solution is prepared containing 400 parts per million of 2-octyloxypyrimidine and 5 g. of D.D.T. in 90 g. of kerosene. This solution is useful as a spray in treating fungal infections of plants.

*Example LVI*

A solution containing 300 parts per million of 2-octyloxy-4,5,6,7-tetrahydro-1,3-diazepine in 4 g. of acetone and 160 g. of Freon–12 (dichlorodifluoromethane, $CCl_2F_2$) is prepared and used as a fungicidal agent in an aerosol form.

*Example LVII*

2-hexylmercapto-4,5,6,7-tetrahydro-1,3-diazepine hydrobromide was dispersed with petroleum jelly to give a mixture which contained 500 parts per million of the active agent. The mixture was found to be effective in treating plants which were infected with late tomato blight.

*Example LVIII*

A solution is prepared containing 800 parts per million of 2-octadecyloxy-1,4,5,6-tetrahydropyrimidine and 5 g. of D.D.T. in 90 g. of kerosene. This antifungal solution is useful as a spray.

Example LIX

A solution containing 300 parts per million of 2-dodecylmercapto-5-ethyl-4,5,6,7-tetrahydro-1,3-diazepine hydrobromide in 4 g. of acetone and 160 g. of Freon-12 is prepared and used as a fungicidal agent in an aerosol form.

Example LX 2-dodecylmercapto-1,4,5,6-tetrahydropyrimidine hydrochloride was dispersed with petroleum jelly to give a mixture which contained 500 parts per million of the active agent. The mixture was found to be effective in treating plants which were infected with late tomato blight.

Example LXI

A solution containing 300 parts per million of 2-(2-octenyloxy)-1,4,5,6-tetrahydropyrimidine hydrobromide in 4 g. of acetone and 160 g. of Freon-12 is prepared and used as a fungicidal agent in an aerosol form.

Compositions similar to those described in Examples II through LXI were prepared using the anti-pathogenic compounds described in Examples I through L.

Example LXII

Pimento trees (the commercial source of the valuable seasoning allspice) which were infected with the rust organism *Puccinia psidii* were sprayed with an aqueous mixture containing 100 parts per milion of 2-tetradelcymercapto-1,4,5,6-tetrahydropyrimidine hydrobromide and a surface active agent. At the end of a one week period, the plants were compared with others of the species identically infested but not treated. It was found that although the infection had increased and multiplied in the controls, the treated plants exhibited no new infection, no yellow spores were visible and the original infection had almost completely disappeared.

What is claimed is:

1. A method for controlling pathogenic fungi infection in a plant which comprises treating said plant with an effective amount of a compound selected from the group consisting of $$R-X-C\underset{\underset{R'}{N}}{\overset{N}{\lessgtr}}(CH_2)_n, \quad R-X-C\underset{\underset{R'}{N-CH}}{\overset{N-CH}{\lessgtr}}, \quad R-X-C\underset{N=CH}{\overset{N-CH}{\lessgtr}}CH$$

and the acid addition salts and quaternary alkyl ammonium salts thereof, said alkyl group containing up to four carbon atoms; wherein R is selected from the group consisting of alkyl and alkenyl containing from one to eighteen carbon atoms; X is selected from the group consisting of oxygen and sulfur; n is an integer from two to five; R' is selected from the group consisting of hydrogen, alkyl and alkenyl containing from one to six carbon atoms the total number of carbon atoms in said R and R' groups when R' is other than hydrogen being seven to twenty-four and the total number of carbon atoms in said R and R' groups when R' is hydrogen being from six to eighteen.

2. The process of claim 1 wherein the compound corresponds to the following formula $$R-S-C\underset{\underset{H}{N-CH}}{\overset{N-CH}{\lessgtr}}$$

wherein R is alkyl having from six to eighteen carbon atoms.

3. The process of claim 1 wherein the compound corresponds to the following formula $$R-S-C\underset{N=CH}{\overset{N-CH}{\lessgtr}}CH$$

wherein R is alkyl having from six to eighteen carbon atoms.

4. The process of claim 1 wherein the compound corresponds to the following formula $$R-S-C\underset{\underset{H}{N=CH_2}}{\overset{N-CH_2}{\lessgtr}}CH_2$$

wherein R is alkyl having from six to eighteen carbon atoms.

5. The process of claim 1 wherein the compound corresponds to the following formula $$R-O-C\underset{\underset{H}{N-CH_2}}{\overset{N-CH_2}{\lessgtr}}CH_2$$

wherein R is alkyl having from six to eighteen carbon atoms.

6. A method for controlling pathogenic fungi infection in a plant which comprises treating said plant with an effective amount of 2-dodecylmercapto-1,4,5,6-tetrahydropyrimidine hydrobromide.

7. A method for controlling pathogenic fungi infection in a plant which comprises treating said plant with an effective amount of 2-tetradecylmercapto-1,4,5,6-tetrahydropyrimidine hydrobromide.

8. A method for controlling pathogenic fungi infection in a plant which comprises treating said plant with an effective amount of 2-hexadecylmercapto-1,4,5,6-tetrahydropyrimidine hydrobromide.

9. A method for controlling pathogenic fungi infection in a plant which comprises treating said plant with an effective amount of 2-octadecylmercapto-1,4,5,6-tetrahydropyrimidine hydrobromide.

10. A method for controlling pathogenic fungi infection in a plant which comprises treating said plant with an effective amount of 2-octylmercapto-4,5,6,7-tetrahydro-1,3-diazepine hydrobromide.

11. A method for controlling pathogenic fungi infection in a plant which comprises treating said plant with an effective amount of 2-tetradecylmercapto-imidazole hydrobromide.

References Cited by the Examiner

UNITED STATES PATENTS

| | | | |
|---|---|---|---|
| 1,912,849 | 6/1933 | Kranzlein et al. | 260—309.6 |
| 2,519,310 | 8/1950 | Dessert | 260—309 |
| 2,865,927 | 12/1958 | Cain | 260—309.6 |
| 2,938,038 | 5/1960 | Hirt | 260—309.6 |

JULIAN S. LEVITT, *Primary Examiner.*

LEWIS GOTTS, *Examiner.*